H. B. YOUNG & R. PALOMINO.
TIRE REMOVER.
APPLICATION FILED MAY 26, 1909.
944,760.
Patented Dec. 28, 1909.
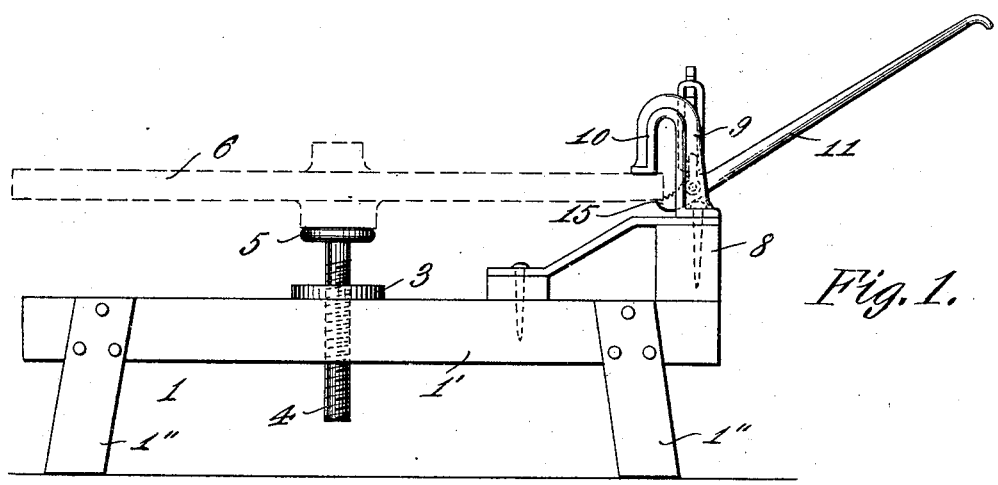
Fig. 1.
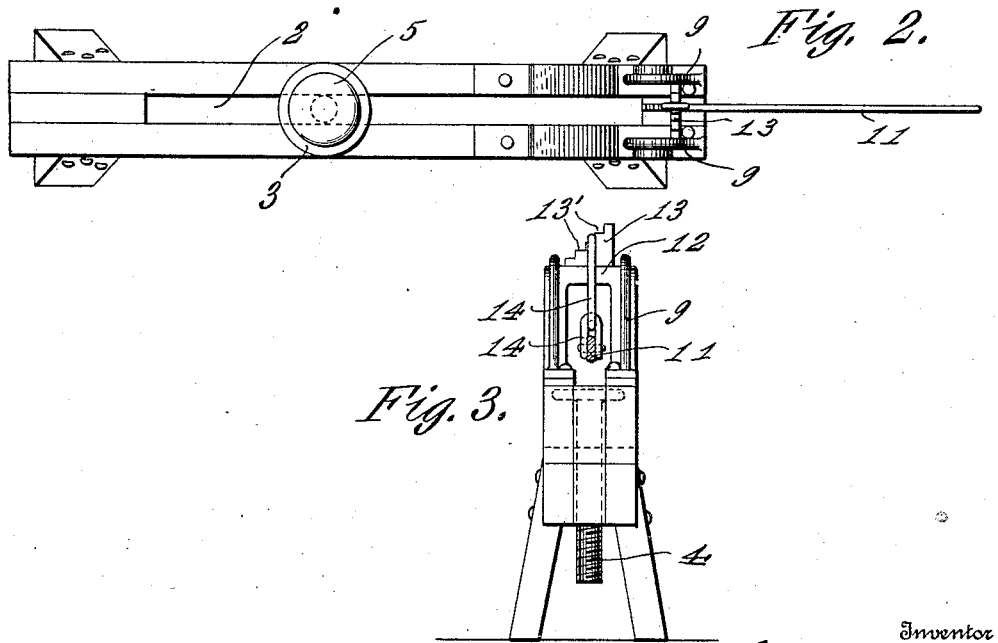
Fig. 2.
Fig. 3.
Witnesses
E. Larson
S. E. Dodge
Inventor
H. B. Young
and
R. Palomino,
By Beeler & Cobb
Attorneys

UNITED STATES PATENT OFFICE.

HARRY B. YOUNG AND REFUGIO PALOMINO, OF SHAFTER, TEXAS.

TIRE-REMOVER.

944,760.  Specification of Letters Patent.  Patented Dec. 28, 1909.

Application filed May 26, 1909. Serial No. 498,480.

*To all whom it may concern:*

Be it known that we, HARRY B. YOUNG and REFUGIO PALOMINO, citizens of the United States, residing at Shafter, in the county of Presidio and State of Texas, have invented certain new and useful Improvements in Tire-Removers, of which the following is a specification.

This invention relates to improvements in wheelright machines, and particularly of a simple, compact, and especially substantial form of machine for the purpose of removing metal tires from wheels.

The invention resides particularly in the peculiar means used to support the wheel as it is rotated in the operation of removing a tire, and in the special devices designed to engage the tire directly in the operation of detaching the same from the rim or felly.

For a full understanding of the invention, reference is to be had to the following detail description and to the accompanying drawings in which—

Figure 1 is a side elevation showing a machine embodying the invention, a wheel being illustrated in dotted lines as when being operated upon by the mechanism; Fig. 2 is a top plan view of the invention, and Fig. 3 is an end elevation, the operating lever being shown in section.

Throughout the following detail description and on the several figures of the drawings similar parts are referred to by like reference characters.

Describing the invention specifically the numeral 1 denotes the support of the tire removing mechanism which comprises preferably a bench or similar body consisting of spaced top bars 1' upon which is mounted a wheel support consisting of a base 3 and a rotary member 4 comprising a screw provided with a head 5 at its upper end, said screw passing through a threaded opening in the base 3 and through the space 2 between the bars 1' of the support 1.

The head 5 of the member 4 is adapted to support the wheel 6 shown in dotted lines by direct engagement with the hub portion of the wheel, and as said wheel is turned in the operation of removing its tire it is contemplated that the rotary supporting member 4 shall turn also and thus gradually raise the wheel bodily during such operation.

At one end of the support 1 are blocks 8 on which is mounted a standard 9, said standard being formed with a downwardly curved arm 10 adapted at its lower end to form a rigid bearing for the felly or rim of the wheel while an operating lever 11 is being actuated to detach the tire of the wheel from said felly. The standard 9 comprises spaced side portions connected by a web 12 and on this web 12 is adapted to rest a plate or hanger 13 having stepped bearings 13'. The lever 11 is connected by links 14 with the hanger 13, the lower link being pivotally connected with the lever between its ends and adjacent to a jaw 15 formed at one extremity of said lever. The upper link 14 receives the web 12 of the standard 9 and is adapted to engage at its upper end with any one of the bearings 13', whereby the position of the lever 11, or rather the pivotal support of said lever may be adjusted vertically to accommodate for wheels having tires of different widths.

In the operation of removing the tire from a wheel, the wheel is gradually turned and elevated by the rotary member or screw 4, the felly of the wheel being engaged beneath the arm 10 so that the tire can be disengaged from said felly by means of the jaw 15 of the lever 11, the outer end of the lever being depressed in this operation and the tire being forced upwardly into the space between the arm 10 and the standard 9 from which it projects.

The operation of removing a tire from a wheel in accordance with this invention is extremely simple, and the mechanism provided as above described affords great leverage in disengaging the tire from the felly without liability of injury to the felly or other parts of the wheel.

Having thus described the invention, what is claimed as new is:

1. In a tire removing device, the combination of a supporting standard having a lateral downwardly extending arm arranged in spaced relation thereto and provided with a bearing for a wheel rim, a link connected with the central portion of the supporting standard, means for effecting vertical adjustment of said link relative to the supporting standard, and a tire removing lever pivotally connected with the link and provided with a jaw in proximity to the bearing of the arm and operable in the space between the arm and the supporting standard.

2. In a tire removing device, the combination of a supporting standard having a downwardly extending arm in spaced relation thereto, said arm and the supporting standard embodying spaced sides, a web connecting the upper portions of the sides of the standard, a detachable hanger having stepped bearings and supported on said web, a tire removing lever, and links suspending the lever pivotally between its ends from the hanger, the lever being adjustable by means of the stepped bearings of said hanger.

3. In a tire removing device, the combination of a support, a standard mounted thereon and having a downwardly curved arm, provided with a bearing for a wheel rim and a lever pendent from said standard and coacting with the arm to detach a tire from a wheel.

4. In a tire removing device, the combination of a wheel support, a standard thereon having a downwardly curved arm, a step bearing member mounted on said standard, a lever, link members pivoted to the lever between its ends, one link member being adapted to engage the step bearings, and a jaw for said lever in proximity to the arm.

In testimony whereof we affix our signatures in presence of two witnesses.

HARRY B. YOUNG.
REFUGIO PALOMINO.

Witnesses:
A. RAMOS,
GERALD YOUNG.